No. 741,027. PATENTED OCT. 13, 1903.
B. H. GEDGE.
EAVES TROUGH.
APPLICATION FILED JAN. 22, 1903.
NO MODEL.
FIG. 1.
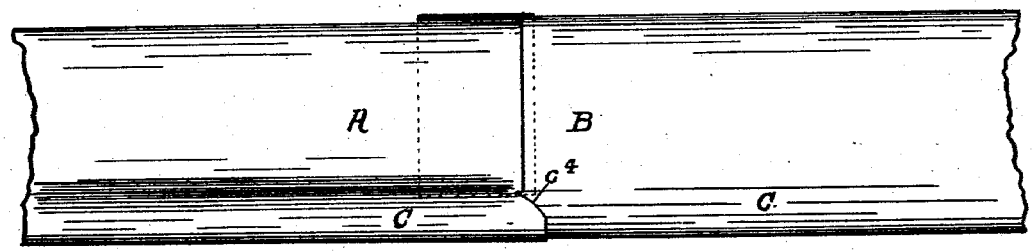
FIG. 2.
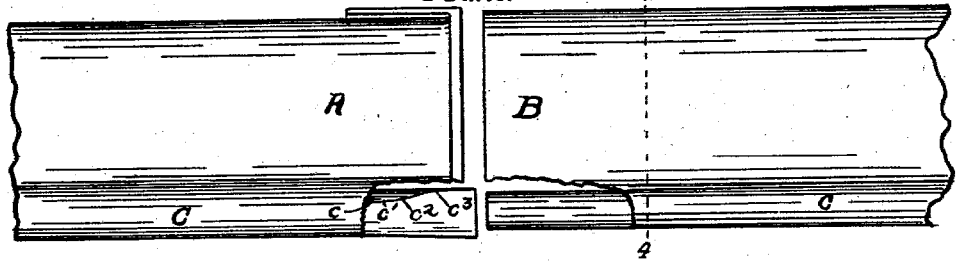
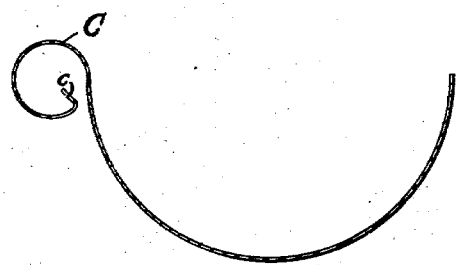
FIG. 3. FIG. 4.
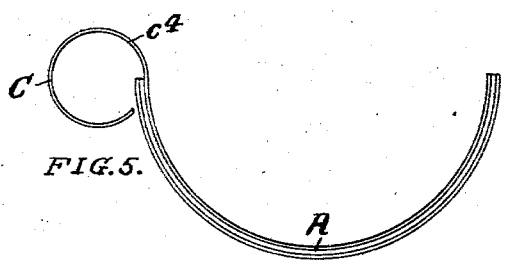
FIG. 5.
Witnesses
Earle K. Passel
Evelyn Cash
Inventor
Burton H. Gedge
By Attorneys
Parkinson & Richard No. 741,027.

Patented October 13, 1903.

UNITED STATES PATENT OFFICE.

BURTON H. GEDGE, OF ANDERSON, INDIANA.

EAVES-TROUGH.

SPECIFICATION forming part of Letters Patent No. 741,027, dated October 13, 1903.

Application filed January 22, 1903. Serial No. 140,110. (No model.)

*To all whom it may concern:*

Be it known that I, BURTON H. GEDGE, a citizen of the United States, residing at Anderson, in the county of Madison and State of Indiana, have invented certain new and useful Improvements in Eaves-Troughs, of which the following is a specification.

The object of my invention is to provide a joint for eaves-troughs by means of which the sections thereof may be readily and securely connected; and my invention consists in the combination and arrangement of parts hereinafter described and claimed.

In the drawings, Figure 1 is a top plan view of the joint formed by two eaves-trough sections embodying my invention; Fig. 2, a top plan view of the joining ends of two of such sections; Fig. 3, an end view of the female member of the joint on an enlarged scale; Fig. 4, a section on line 4 4 of Fig. 2, showing the male member of the joint on an enlarged scale; and Fig. 5, another end view showing simply the end of the female member of the joint without the parts behind the end plane on an enlarged scale.

Reference-letter A denotes the female member of the joint, B the male member, and C the edge bead of the trough. Members A and B are the usual members of a slip-joint eaves-trough with the usual edge bead C. For convenience in manufacture and in order to strengthen and stiffen the bead C and the joint between the sections it is desirable to provide an inturned lip or flange $c$. These lips $c$ if extended up to the joining ends of both sections materially interfere by engagement with each other with making the joint. To obviate this difficulty, I extend the lip $c$ throughout the length of the bead C up to and including a portion of the lap of the female joint member. At point $c'$, within the lap of the joint, I bend the lip $c$ outwardly and slightly flare the end of the bead C until the lip $c$ runs into and forms a part of the conical wall of the flared end of the bead. This forms the female end of the bead into a continuous smooth curved surface at its outer end, with a guiding edge $c^2$ commencing at a point $c^3$ back of the mouth of the bead C and gradually rising into the interior of the bead until it runs into and coincides with the edge of the lip $c$ at point $c'$, thus forming a guiding edge for the lip $c$ on the male end of the bead to cause engagement with the lip $c$ in the female end of the bead. To further facilitate the making of the joint, I cut the outer upper corner of the female end of the bead C diagonally at $c^4$ to form a guide edge for the edge of the male end of the bead.

In forming the joint the initial engagement between the parts is readily effected by virtue of the guide edge $c^4$; the fact that the end of the female bead is slightly flared and larger than the male end, and the smooth continuous surface of the extreme end of the bead presents no inturned lip to entangle with the incoming lip of the male member. As the parts are pressed further together the lip $c$ on the male bead is engaged by the guide edge $c^2$ and directed into engagement with the lip $c$ in the female bead, thus forming a tight, stiff, and secure joint.

It is obvious that the same construction can be used with the ordinary lap-joint eaves-trough sections with advantage.

I claim as my invention—

1. An eaves-trough section in which the bead is provided with an internally-projecting lip, and the female end of the bead has a smooth continuous curved surface and a guiding edge connecting its end edge with the edge of the lip, substantially as specified.

2. An eaves-trough section in which the bead is provided with an internally-projecting lip, and the female end of the bead is flared outwardly and provided with a guiding edge connecting its end edge with the edge of the lip, substantially as specified.

3. An eaves-trough section in which the bead is provided with an internally-projecting lip, and the female end of the bead has a smooth continuous curved surface and a guiding edge starting at a point back of the end and connecting the edge of the lip with the end edge of the bead, substantially as specified.

4. An eaves-trough section in which the bead is provided with an internally-projecting lip, and the female end of the bead has a smooth continuous curved surface, is flared outwardly and provided with a guiding edge starting at a point back of the end and connecting the end edge with the edge of the lip, substantially as specified.

5. The combination in an eaves-trough-section joint of the bead C having a flaring mouth and provided with lip $c$; guiding edge $c^2$ starting at a point back of the end and connecting the end edge with the edge of the lip; and diagonal guiding edge $c^4$ for the male end of the bead, substantially as specified.

BURTON H. GEDGE.

Witnesses:
BLANCHARD J. HORNE,
ROSE DILTS.